US008958976B2

(12) United States Patent
Kajima et al.

(10) Patent No.: US 8,958,976 B2
(45) Date of Patent: Feb. 17, 2015

(54) TRAVELING APPARATUS, CONTROL METHOD THEREFOR, AND CONTROL PROGRAM

(75) Inventors: Hideki Kajima, Toyota (JP); Yoshiyuki Semba, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 929 days.

(21) Appl. No.: 12/785,123

(22) Filed: May 21, 2010

(65) Prior Publication Data

US 2010/0305841 A1  Dec. 2, 2010

(30) Foreign Application Priority Data

May 28, 2009  (JP) .................................. 2009-128699

(51) Int. Cl.
*G06F 17/10*  (2006.01)
*A61G 5/04*  (2013.01)
*A61G 5/10*  (2006.01)
(Continued)

(52) U.S. Cl.
CPC  *A61G 5/043* (2013.01); *A61G 5/10* (2013.01); *B60L 3/0015* (2013.01); *B60L 15/2009* (2013.01); *A61G 2203/42* (2013.01); *B60L 2200/16* (2013.01); *B60L 2200/34* (2013.01)
USPC ....................................................... 701/124

(58) Field of Classification Search
CPC .......................... B60L 2200/16; B60L 2200/34
USPC ....................................................... 701/124
See application file for complete search history.

(56) References Cited

U.S. PATENT DOCUMENTS 6,062,600 A * 5/2000 Kamen et al. ................. 280/755
6,311,794 B1 * 11/2001 Morrell et al. ................ 180/8.3
(Continued)

FOREIGN PATENT DOCUMENTS

| JP | 2000-514680 A | 7/2000 |
| JP | 2004-074814 A | 3/2004 |

(Continued)

OTHER PUBLICATIONS

Alex Abramovici and Jake Chapsky, Feedback Control Systems: A Fast-Track Guide for Scientists and Engineers, 2000, Kluwer Academic Publishers, p. 4.*

(Continued)

*Primary Examiner* — Calvin Cheung
*Assistant Examiner* — Lail Kleinman
(74) *Attorney, Agent, or Firm* — Kenyon & Kenyon LLP

(57) ABSTRACT

Provided is a traveling apparatus which performs desired traveling under an inverted pendulum control. The traveling apparatus includes: a ground contact member that operates to come into a ground-contact state or a non-ground-contact state with respect to a road surface; a drive portion that drives the ground contact member; a control portion that controls the drive portion; an abnormality degree calculation portion that calculates a degree of abnormality of a traveling state; and an upper bound calculation portion that changes an upper bound of a distance between the ground contact member and the road surface according to the degree of abnormality of the traveling state calculated by the abnormality degree calculation portion. The control portion controls driving of the drive portion so that the distance between the ground contact member and the road surface is smaller than or equal to the upper bound calculated by the upper bound calculation portion.

9 Claims, 10 Drawing Sheets

(51) Int. Cl.
    *B60L 3/00*     (2006.01)
    *B60L 15/20*     (2006.01)

(56) References Cited

U.S. PATENT DOCUMENTS

| | | | |
|---|---|---|---|
| 2006/0097683 A1* | 5/2006 | Hosoda et al. | 318/568.12 |
| 2006/0243499 A1* | 11/2006 | Hosoda | 180/8.5 |
| 2009/0223728 A1* | 9/2009 | Koide et al. | 180/197 |
| 2011/0035101 A1* | 2/2011 | Kawada et al. | 701/36 |

FOREIGN PATENT DOCUMENTS

| | | |
|---|---|---|
| JP | 2004-217170 A | 8/2004 |
| JP | 2006-247802 A | 9/2006 |
| JP | 2007-062682 A | 3/2007 |
| JP | 2008-247138 A | 10/2008 |
| WO | 2007/100148 A1 | 9/2007 |

OTHER PUBLICATIONS

Office Action in corresponding Japanese Patent Application dated Apr. 5, 2011 and partial English translation thereof.

* cited by examiner

TRAVELING APPARATUS, CONTROL METHOD THEREFOR, AND CONTROL PROGRAM

INCORPORATION BY REFERENCE

This application is based upon and claims the benefit of priority from Japanese patent application No. 2009-128699, filed on May 28, 2009, the disclosure of which is incorporated herein in its entirety by reference.

BACKGROUND OF THE INVENTION

1. Field of the Invention

The present invention relates to a traveling apparatus that attains desired traveling under an inverted pendulum control, a control method therefor, and a control program. In particular, the present invention relates to a traveling apparatus including a ground contact member that contacts a road surface, a control method therefor, and a control program.

2. Description of Related Art

There is known a traveling apparatus in which, when an abnormality or the like is detected during travel in an inverted state, for example, a ground contact member is allowed to contact a road surface to stop the traveling apparatus safely, thereby preventing overturning of the traveling apparatus more safely (e.g., see Japanese Unexamined Patent Application No. 2004-074814).

In general, however, there is only a short period of time between the occurrence of an abnormality or the like and the time when the ground contact member contacts the road surface. Accordingly, if the operation speed for allowing the ground contact member to move closer to the road surface is not sufficient, for example, there is a possibility that preparation for allowing the ground contact member to contact the road surface is insufficient. As a result, the effect of preventing overturning or the like may not be sufficiently obtained and the safety of the traveling apparatus may be lowered.

The present invention has been made to solve the above-mentioned problem, and therefore has a primary object to provide a traveling apparatus which is improved in safety, a control method therefor, and a control program.

SUMMARY OF THE INVENTION

To achieve the above-mentioned object, according to a first exemplary aspect of the present invention, there is provided a traveling apparatus which performs desired traveling under an inverted pendulum control, including: a ground contact member that operates to come into one of a ground-contact state and a non-ground-contact state with respect to a road surface; drive means that drives the ground contact member; control means that controls the drive means; abnormality degree calculation means that calculates a degree of abnormality of a traveling state; and upper bound calculation means that changes an upper bound of a distance between the ground contact member and the road surface according to the degree of abnormality of the traveling state calculated by the abnormality degree calculation means. The control means controls driving of the drive means so that the distance between the ground contact member and the road surface is smaller than or equal to the upper bound calculated by the upper bound calculation means.

Further, in the first exemplary aspect, the upper bound calculation means may set the upper bound so as to decrease as the degree of abnormality of the traveling state increases, the degree of abnormality being calculated by the abnormality degree calculation means.

Further, in the first exemplary aspect, the traveling apparatus may further include sensor means that detects a state quantity of the traveling apparatus. The degree of abnormality of the traveling state may be a ratio between a deviation between the state quantity of the traveling apparatus and a target value of the state quantity, and a maximum value of the deviation, the state quantity being detected by the sensor means.

Still further, in the first exemplary aspect, the degree of abnormality of the traveling state may include a degree of abnormality of each of a posture state of the traveling apparatus, a rotation state of a drive wheel, and a traveling speed of the traveling apparatus.

Yet further, in the first exemplary aspect, the degree of abnormality of the traveling state may be a ratio between a posture angle deviation between an actual posture angle and a target posture angle, and a maximum value of the posture angle deviation.

Furthermore, in the first exemplary aspect, the degree of abnormality of the traveling state may be a ratio between a drive wheel deviation between an actual rotation angle of the drive wheel and a target rotation angle of the drive wheel, and a maximum value of the drive wheel deviation.

Moreover, in the first exemplary aspect, the degree of abnormality of the traveling state may be a ratio between a traveling speed and a maximum value of the traveling speed.

Note that in the first exemplary aspect, the abnormality degree calculation means may calculate a plurality of degrees of abnormality of the traveling state, and may select the degree of abnormality having a maximum value from among the plurality of degrees of abnormality calculated, and the upper bound calculation means may change the upper bound based on the degree of abnormality selected by the abnormality degree calculation means and on map information indicating a relationship between the degree of abnormality and the upper bound.

To achieve the above-mentioned object, according to a second exemplary aspect of the present invention, there is provided a control method for a traveling apparatus which includes: a ground contact member that operates to come into one of a ground-contact state and a non-ground-contact state with respect to a road surface; and drive means that drives the ground contact member, and which performs desired traveling under an inverted pendulum control, the method including: calculating a degree of abnormality of a traveling state; and changing an upper bound of a distance between the ground contact member and the road surface according to the degree of abnormality of the traveling state calculated. Driving of the drive means may be controlled so that the distance between the ground contact member and the road surface is smaller than or equal to the upper bound calculated.

To achieve the above-mentioned object of the present invention, according to a third exemplary aspect of the present invention, there is provided a control program for a traveling apparatus which includes: a ground contact member that operates to come into one of a ground-contact state and a non-ground-contact state with respect to a road surface; and drive means that drives the ground contact member, and which performs desired traveling under an inverted pendulum control, the control program causing a computer to execute processing including: calculating a degree of abnormality of a traveling state; changing an upper bound of a distance between the ground contact member and the road surface according to the degree of abnormality of the traveling state calculated; and controlling driving of the drive means so that the distance between the ground contact member and the road surface is smaller than or equal to the upper bound calculated.

According to exemplary aspects of the present invention, it is possible to provide a traveling apparatus which is improved in safety, a control method therefor, and a control program.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Figure 1A:
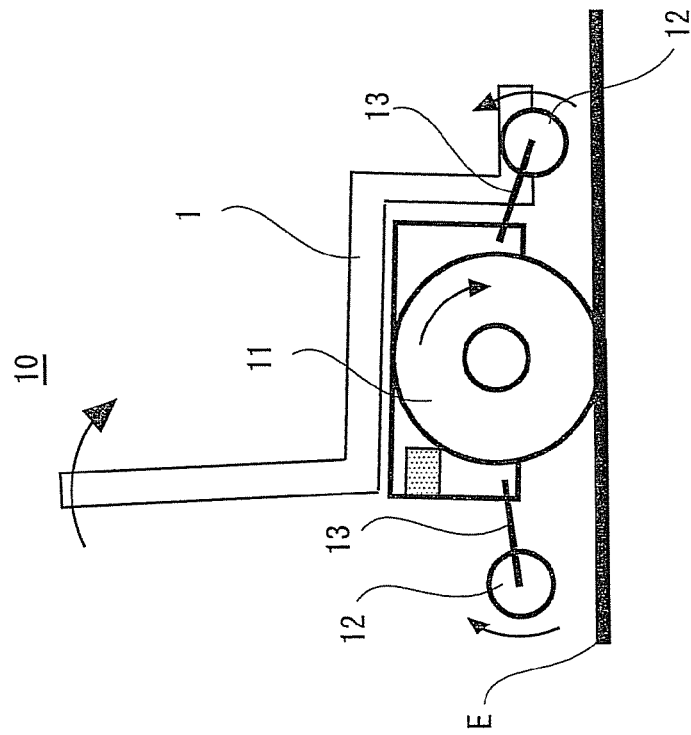
FIG. 1A is a model view showing a two-dimensional model of a traveling apparatus according to an exemplary embodiment of the present invention, and is a side view of the traveling apparatus.
Figure 1B:
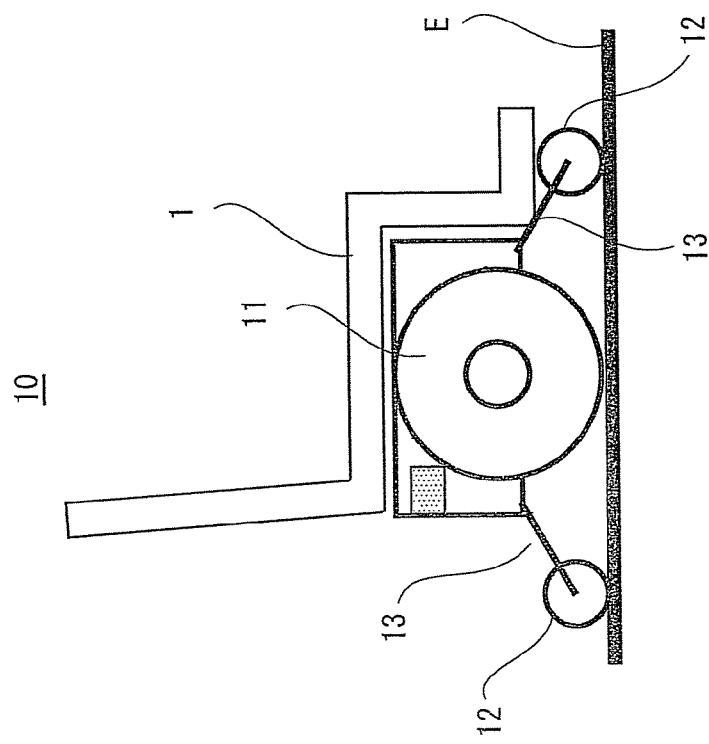
FIG. 1B is a model view showing a two-dimensional mode of the traveling apparatus according to an exemplary embodiment of the present invention, and is a side view of the traveling apparatus.
Figure 2:
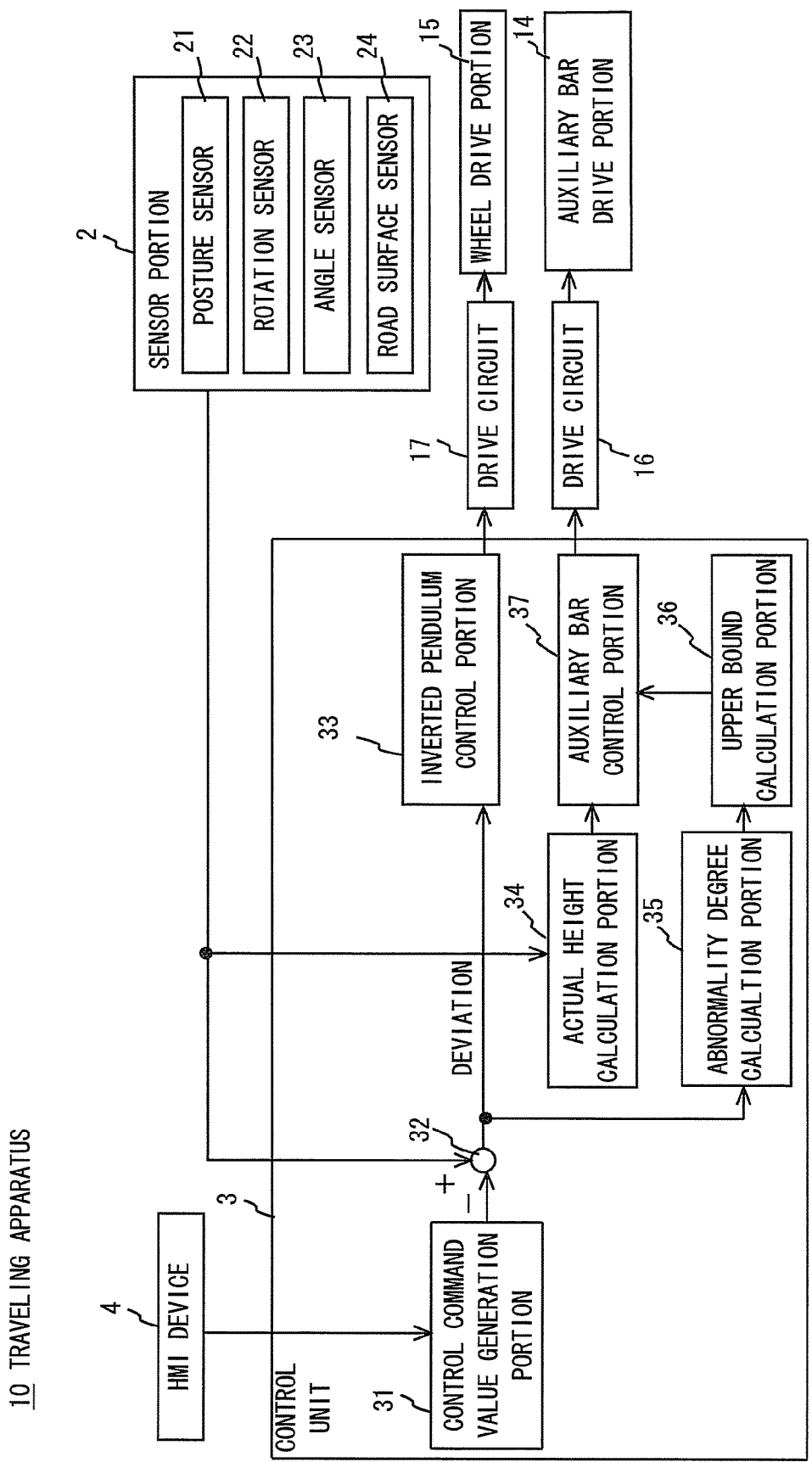
FIG. 2 is a block diagram showing a schematic system configuration of the traveling apparatus according to an exemplary embodiment of the present invention.

Exemplary embodiments for carrying out the present invention will be described below with reference to the accompanying drawings. FIGS. 1A and 1B are model views each showing a two-dimensional model of a traveling apparatus according to an exemplary embodiment of the present invention, and are side views of the traveling apparatus. FIG. 1A shows an example of the traveling apparatus in which auxiliary wheels are in contact with a ground. FIG. 1B shows an example of the traveling apparatus in which the auxiliary wheels are not in contact with the ground and which is in an inverted state. FIG. 2 is a block diagram showing a schematic system configuration of the traveling apparatus according to an exemplary embodiment of the present invention.

A traveling apparatus 10 according to this exemplary embodiment includes a vehicle body 1 on which a passenger rides, a pair of drive wheels 11, a pair of auxiliary wheels 12, a sensor portion 2, an auxiliary bar drive portion 14, a wheel drive portion 15, and a control unit 3. The pair of drive wheels 11 are mounted on the vehicle body 1. The pair of auxiliary wheels 12 contact a road surface E to stabilize the vehicle body 1. The sensor portion 2 detects various information on the vehicle body 1 and the like. The auxiliary bar drive portion 14 allows the auxiliary wheels 12 to swing through auxiliary bars 13. The wheel drive portion 15 rotationally drives the drive wheels 11 of the vehicle body 1. The control unit 3 drives and controls each of the auxiliary bar drive portion 14 and the wheel drive portion 15.

The vehicle body 1 is structured as a wheelchair-type vehicle, for example. The pair of right and left drive wheels 11, which allow the vehicle body 1 to travel, are rotatably provided on both sides of the vehicle body 1. The auxiliary wheels 12, which contact the road surface E to stabilize the vehicle body 1, are provided, respectively, at the front and rear sides of the vehicle body 1 through the auxiliary bars 13.

While in this exemplary embodiment, the vehicle body 1 is structured as a wheelchair-type vehicle, the structure of the vehicle body 1 is not limited thereto. For example, the vehicle body 1 may be structured as a standing ride type coaxial two-wheel vehicle, and may be structured as any type of vehicle that performs an inverted pendulum control. Further, the auxiliary wheels 12 are provided at the front and rear sides of the vehicle body 1, respectively, through the auxiliary bars 13, but the structure is not limited thereto. For example, the auxiliary wheels 12 may be provided at one of the rear and front sides of the vehicle body 1, and the number and position of the auxiliary wheels 12 to be provided may be arbitrarily determined. Furthermore, the auxiliary wheels 12 are mounted to the vehicle body 1 through the auxiliary bars 13 and the auxiliary wheels 12 contact the road surface E, but the structure is not limited thereto. For example, only the auxiliary bars 13 may be mounted to the vehicle body 1 so that the leading ends of the auxiliary bars 13 are allowed to contact the road surface E. Any type of ground contact member is applicable.

One end of each of the auxiliary bars 13 is mounted to the vehicle body 1 so as to be swingable vertically, and the other end of each of the auxiliary bars 13 is provided with the auxiliary wheel 12 rotatably mounted thereto. When the auxiliary bars 13 swing downward, the auxiliary wheels 12 come close to the road surface E and contact the ground (this state is hereinafter referred to as "ground-contact state"). Meanwhile, when the auxiliary bars 13 swing upward, the auxiliary wheels 12 are spaced from the road surface E (this state is hereinafter referred to as "non-ground-contact state").

As shown in FIG. 1A, for example, the traveling apparatus 10 according to this exemplary embodiment comes into the ground-contact state in which the auxiliary wheels 12 contact the road surface E. This enables the vehicle body 1 to stably travel or stop without any inverted pendulum control. Meanwhile, as shown in FIG. 1B, the traveling apparatus 10 causes the auxiliary bars 13 to swing upward to allow the auxiliary wheels 12 to be spaced from the road surface E, and comes into an inverted state. This makes it possible to attain desired traveling states (forward movement, backward movement, left turn, right turn, acceleration, deceleration, stop, etc.) in accordance with a traveling operation by the passenger, under the inverted pendulum control for maintaining the inverted state.

Note that the passenger can input various operation information on the traveling apparatus 10 through, for example, an HMI (Human Machine Interface) device 4 which is mounted to the vehicle body 1 and connected to the control unit 3. The HMI device 4 is provided with a joystick, a switch, and the like, the operation of which allows the passenger to input operation information.

The vehicle body 1 is provided with the sensor portion (sensor means) 2 including multiple sensors for detecting various information (state quantities) of the vehicle body 1, the auxiliary bars 13, and the like. The sensor portion 2 includes a posture sensor 21, a rotation sensor 22, an angle sensor 23, and a road surface sensor 24. The posture sensor 21 detects posture information of the vehicle body 1. The rotation sensor 22 detects rotation information of each of the drive wheels 11. The angle sensor 23 detects a swing angle of each of the auxiliary bars 13. The road surface sensor 24 detects road surface information.

As the posture sensor 21, a gyroscopic sensor, an acceleration sensor, or the like is used. The posture sensor 21 can detect a tilt angle (posture angle), a tilt angular velocity (posture angular velocity), a tilt angular acceleration (posture angular acceleration), or the like of the vehicle body 1. The rotation sensor 22 is mounted to an axle of each of the drive wheels 11, for example, and can detect a rotation angle, a rotation angular velocity, a rotation angular acceleration, or the like of each of the drive wheels 11. As the angle sensor 23, a rotary encoder, a potentiometer, or the like is used. The angular sensor 23 is mounted to each of the auxiliary bars 13, and can detect the swing angle of each of the auxiliary bars 13. As the road surface sensor 24, a camera, an ultrasonic sensor, a radar sensor, or the like is used. The road surface sensor 24 can detect road information such as a height, unevenness, inclination, a friction coefficient, and an obstacle on the road surface E. The sensor portion 2 is connected to the control unit 3 and outputs a detected value to the control unit 3.

The auxiliary bar drive portion (drive means) 14 is mounted to each of the auxiliary bars 13, and is composed of a motor, a speed reducer, and the like which allow each of the auxiliary bars 13 to swing. The auxiliary bar drive portion 14 is connected to the control unit 3 through a drive circuit 16, and causes each of the auxiliary bars 13 to swing vertically in response to a control signal from the control unit 3.

The wheel drive portion 15 is mounted to the vehicle body 1 and is composed of a pair of motors, a speed reducer, and the like that allow the pair of drive wheels 11 to be rotationally driven independently of each other. The wheel drive portion 15 is connected to the control unit 3 through a drive circuit 17, and drives each of the drive wheels 11 in response to a control signal from the control unit 3.

The control unit 3 controls the auxiliary bar drive portion 14 to control the swing of each of the auxiliary bars 13, thereby controlling each of the auxiliary wheels 12 to be brought into the ground-contact state or non-ground-contact state with respect to the road surface E. The control unit 3 also controls the wheel drive portion 15 to control the rotation torque of each of the drive wheels 11, thereby performing a control for attaining desired traveling under the inverted pendulum control.

The control unit 3 includes a control command value generation portion 31, a deviation calculation portion 32, an inverted pendulum control portion 33, an actual height calculation portion 34, an abnormality degree calculation portion 35, an upper bound calculation portion 36, and an auxiliary bar control portion 37.

Note that the control unit 3 may be implemented by hardware with a microcomputer as a center, for example, and the microcomputer includes a CPU (Central Processing Unit) for performing control processing, arithmetic processing, and the like, a ROM (Read Only Memory) for storing a control program executed by the CPU, a calculation program and the like, and a RAM (Random Access Memory) for temporarily storing processed data and the like.

The control command value generation portion 31 generates control command values for controlling the auxiliary bar drive portion 14 and the wheel drive portion 15, based on the operation information received through the HMI device 4. Examples of the control command values include a target posture angle, a target posture angular velocity, and a target posture angular acceleration of the vehicle body 1, a target drive wheel rotation angle, a target drive wheel rotation angular velocity, a target wheel rotation angular acceleration, a target drive wheel translational direction, and a target drive wheel turning direction of each of the drive wheels 11, a target auxiliary bar rotation angle of the auxiliary bar 13, and a target traveling speed (target translational-direction speed) and a target travel acceleration of the traveling apparatus 10. The control command value generation portion 31 outputs the generated control command values to the deviation calculation portion 32.

The deviation calculation portion 32 calculates a deviation between the control command value generated by the control command value generation portion 31 and the detected value detected by the sensor portion 2. For example, the deviation calculation portion 32 calculates a posture angle deviation $\Delta\eta$ between the target posture angle of the vehicle body 1, which is generated by the control command value generation portion 31, and the posture angle of the vehicle body 1, which is detected by the posture sensor 21 of the sensor portion 2. Further, the deviation calculation portion 32 calculates a drive wheel deviation $\Delta W$ between the target drive wheel rotation angle generated by the control command value generation portion 31 and the drive wheel rotation angle detected by the rotation sensor 22 of the sensor portion 2. Furthermore, the deviation calculation portion 32 may calculate a drive wheel translational-direction deviation $\Delta X$, which is a deviation in the translational direction of the drive wheels 11, a drive wheel turning-direction deviation $\Delta\Phi$, which is a deviation in the turning direction of the drive wheels 11, a rotation torque deviation $\Delta T$ (current deviation $\Delta I$) of the drive wheels 11, and the like. The deviation calculation portion 32 outputs the multiple calculated deviations to each of the inverted pendulum control portion 33 and the abnormality degree calculation portion 35.

The inverted pendulum control portion 33 generates a control signal for controlling the wheel drive portion 15, based on the deviations calculated by the deviation calculation portion 32. The inverted pendulum control portion 33 generates a control signal for converging each of the deviations calculated by the deviation calculation portion 32 to "0", for example, thereby attaining desired traveling under the inverted pendulum control of the traveling apparatus 10. The inverted pendulum control portion 33 outputs the generated control signal to the wheel drive portion 15 through the drive circuit 17, thereby controlling the rotation torque of each of the drive wheels 11. The inverted pendulum control portion 33 may control the rotation torque of each of the drive wheels 11 by using, for example, a well-known control method such as a state feedback control or a robust control.

The actual height calculation portion 34 calculates a distance between the auxiliary wheels 12 and the road surface E, i.e., a height "h" from the road surface E to a lowest point (ground point) of the auxiliary wheels 12 (the height is hereinafter referred to as "auxiliary wheel height "h"") based on the posture angle of the vehicle body 1, which is detected by the posture sensor 21 of the sensor portion 2, the swing angle of the auxiliary bars 13, which is detected by the angle sensor 23, and the road information detected by the road surface sensor 24. The actual height calculation portion 34 outputs the calculated auxiliary wheel height "h" to the auxiliary bar control portion 37.

The abnormality degree calculation portion (abnormality degree calculation means) 35 calculates an abnormality degree R of a traveling state. The abnormality degree R is a ratio (rate) between the deviation calculated by the deviation calculation portion 32 and the maximum value of the deviation (maximum deviation). The maximum value of the deviation herein described refers to a value which is determined in advance due to mechanical or electrical constraints of hardware of the traveling apparatus 10, i.e., a mechanical or electrical limit value, for example.

The abnormality degree calculation portion 35 calculates, for example, a ratio Rate_$\eta$ between the posture deviation $\Delta\eta$, which is calculated by the deviation calculation portion 32, and a maximum posture deviation $\eta$_max, as the abnormality degree R of the posture deviation, by the following expression (1).

$$\text{Rate}\_\eta = |\Delta\eta/\eta\_\text{max}| \quad (1)$$

Similarly, the abnormality degree calculation portion 35 calculates a ratio Rate_W between the drive wheel deviation $\Delta$W, which is calculated by the deviation calculation portion 32, and a maximum drive wheel deviation W_max, as the abnormality degree R of the drive wheel deviation, by the following expression (2).

$$\text{Rate}\_W = |\Delta W/W\_\text{max}| \quad (2)$$

Note that the abnormality degree calculation portion 35 may calculate a ratio Rate_V between a traveling speed V, which is detected by the sensor portion 2, and a maximum traveling speed V_max, as the abnormality degree R of the speed, by the following expression (3).

$$\text{Rate}\_V = |V/V\text{max}| \quad (3)$$

In this manner, the abnormality degree calculation portion 35 may calculate a ratio between a given detected value detected by the sensor portion 2 and the maximum value of the detected value, as the abnormality degree R. Alternatively, the abnormality degree calculation portion 35 may use a given detected value detected by the sensor portion 2, as the abnormality degree R. Any value indicating the abnormality degree R of the traveling state is applicable. The abnormality degree calculation portion 35 may calculate the abnormality degree R of the traveling state with high accuracy by using the detected value detected by the sensor portion 2, such as the road information detected by the road surface sensor 24.

The abnormality degree calculation portion 35 calculates the multiple abnormality degrees R at the same time in the manner as described above. Then, the abnormality degree calculation portion 35 selects the abnormality degree R having a maximum value from among the multiple abnormality degrees R thus calculated, and outputs the selected abnormality degree R to the upper bound calculation portion 36. The abnormality degree calculation portion 35 may calculate a mean value of the multiple calculated abnormality degrees R, and may output the mean value of the abnormality degrees R to the upper bound calculation portion 36.

The upper bound calculation portion (upper bound calculation means) 36 calculates an upper bound H of the auxiliary wheel height "h" based on the abnormality degree R calculated by the abnormality degree calculation portion 35 and on preset map information. As the map information herein described, the relationship between the abnormality degree R and the upper bound H as shown in FIG. 3 is set in a RAM.

Figure 3:
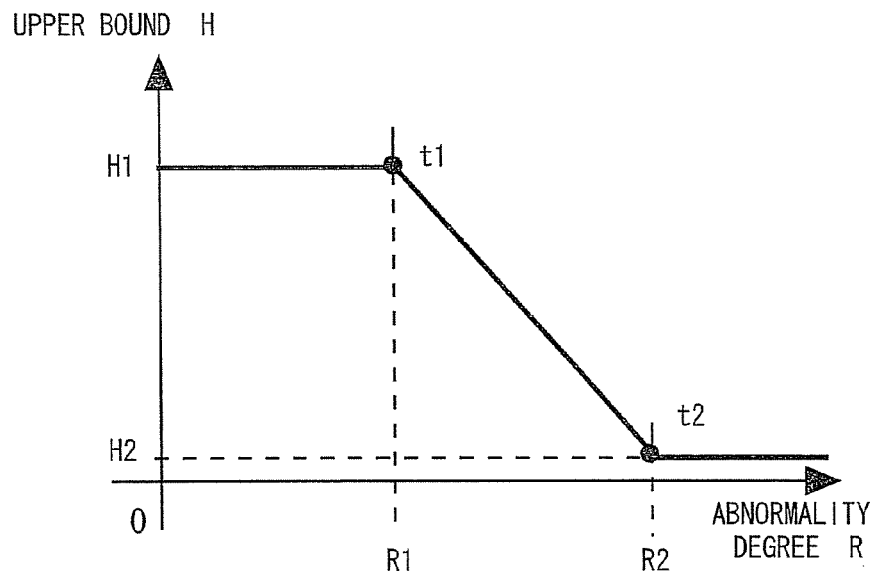
FIG. 3 is a graph showing an exemplary relationship between a degree of abnormality of a traveling state and an upper bound.

As shown in FIG. 3, for example, it is preferable that the upper bound H be set so as to decrease as the abnormality degree R increases. Specifically, when the abnormality degree R is in a range of 0 to R1 (0≤R≤R1), the upper bound H is kept constant at H1. When the abnormality degree R is in a range of R1 to R2 (R1≤R≤R2), the upper bound H gradually decreases as the abnormality degree R increases. When the abnormality degree R is greater than or equal to R2 (R≥R2), the upper bound H is kept constant at H2. Note that the relationship between the abnormality degree R and the upper bound H is not limited to the above relationship, and any relationship is applicable as long as the relationship is set so that the upper bound H decreases as the abnormality degree R increases.

In this manner, the auxiliary wheel height "h" is kept low in advance by setting the upper bound H of the auxiliary wheel height "h" so as to decrease as the abnormality degree R of the traveling state increases, to thereby fully prepare for allowing the auxiliary wheels 12 to contact the ground. Therefore, even when an abnormality occurs in the traveling state of the traveling apparatus 10, it is possible to ground the auxiliary wheels 12 reliably and rapidly and optimally prevent overturning, for example, of the traveling apparatus 10. The upper bound calculation portion 36 outputs the calculated upper bound H of the auxiliary wheel height "h" to the auxiliary bar control portion 37.

The auxiliary bar control portion (control means) 37 controls the auxiliary bar drive portion 14 so that the swing angle of each of the auxiliary bars 13, which is detected by the angle sensor 23, becomes a set target angle. Further, the auxiliary bar control portion 37 controls the auxiliary bar drive portion 14 so that the auxiliary wheel height "h" calculated by the actual height calculation portion 34 is smaller than or equal to the upper bound H of the auxiliary wheel height "h" calculated by the upper bound calculation portion 36, thereby controlling the swing of each of the auxiliary bars 13.

Figure 4:
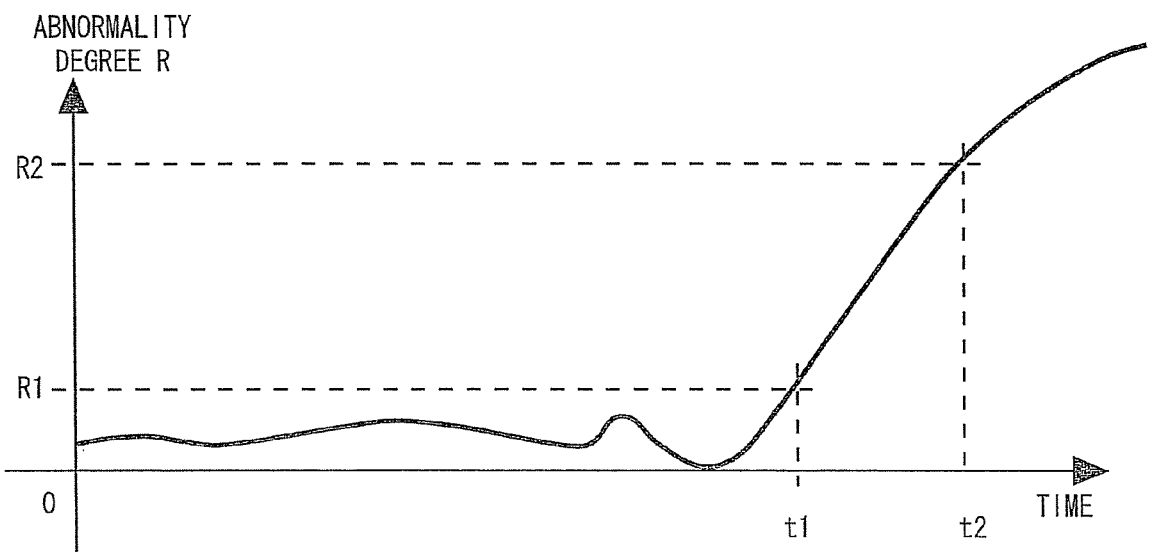
FIG. 4 is a graph showing an exemplary state in which the degree of abnormality of traveling state changes.

For example, as shown in FIG. 4, it is assumed that the abnormality degree R gradually increases with the lapse of time "t" such that the abnormality degree R becomes R1 at the time t1 and the abnormality degree R becomes R2 at the time t2. It is also assumed that the relationship between the upper bound H and the abnormality degree R as shown in FIG. 3 is set in the map information.

Figure 5:
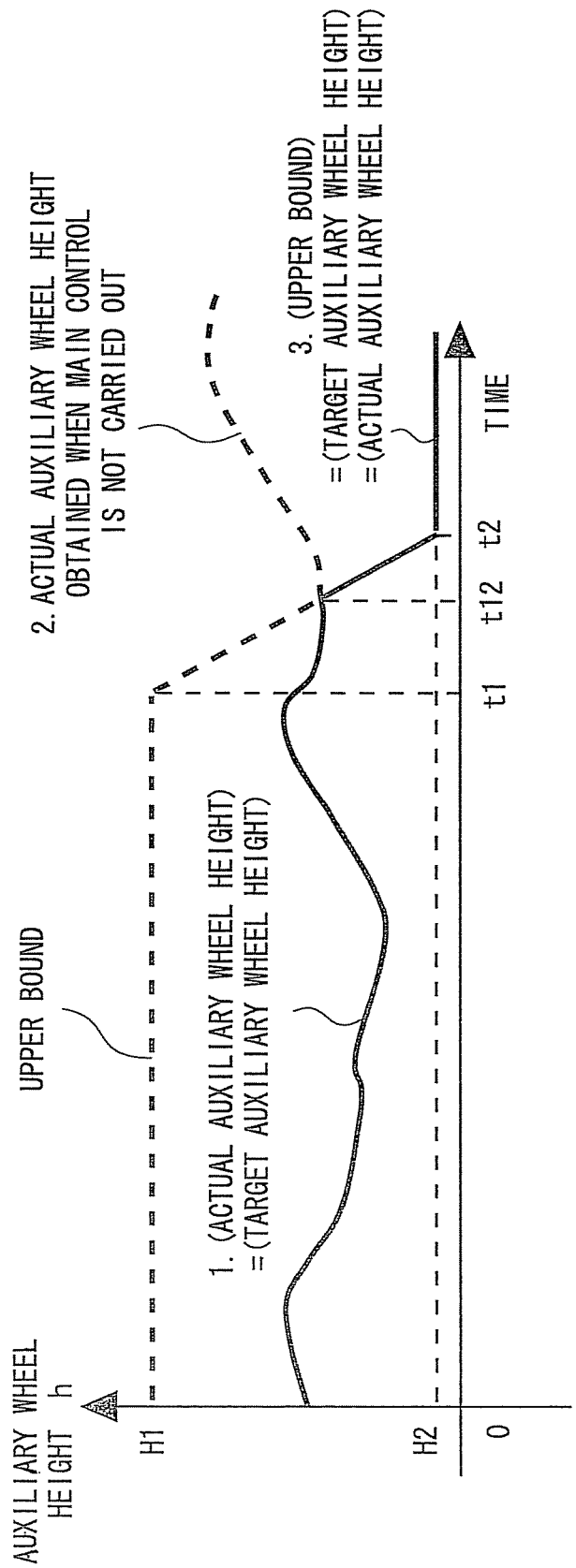
FIG. 5 is a diagram showing an exemplary state in which a target auxiliary wheel height is kept low by the upper bound.

In this case, as shown in FIG. 5, the upper bound H is greater than the normal target auxiliary wheel height during a period from the time 0 to the time t12 (t1<t12<t2). Accordingly, the actual auxiliary wheel height "h" is maintained at the target auxiliary wheel height (as indicated by the solid line 1 of FIG. 5, actual auxiliary wheel height "h"=target auxiliary wheel height). In the case where the abnormality degree R increases and the upper bound H decreases, if the main control is not performed by the auxiliary bar control portion 37 after the time t12, the target auxiliary wheel height is greater than the upper bound H (as indicated by the dashed line 2 of FIG. 5).

Meanwhile, in this exemplary embodiment, the auxiliary bar control portion 37 controls the swing of each of the auxiliary bars 13 so that the upper bound H decreases as the abnormality degree R increases and that the auxiliary wheel height "h" is smaller than or equal to the upper bound H. As a result, after the time t12, the target auxiliary wheel height is kept low by the upper bound H, and the target auxiliary wheel height changes with the upper bound H and decreases (as indicated by the solid line 3 of FIG. 5, upper bound H=target auxiliary wheel height=actual auxiliary wheel height "h").

Figure 6B:
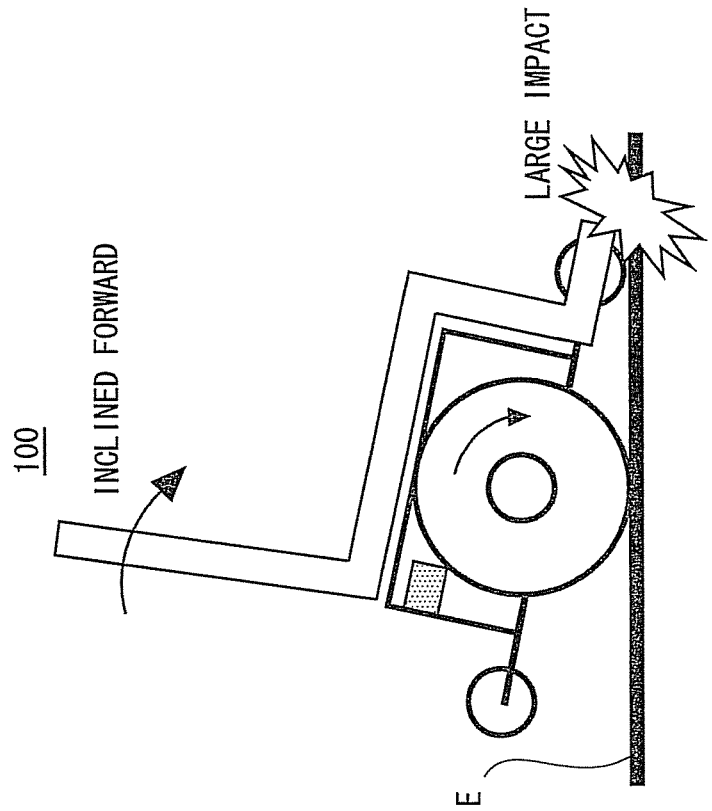
FIG. 6B is a diagram showing an exemplary state in which the traveling apparatus of the related art is inclined forward and the auxiliary wheels contact the ground.
Figure 6A:
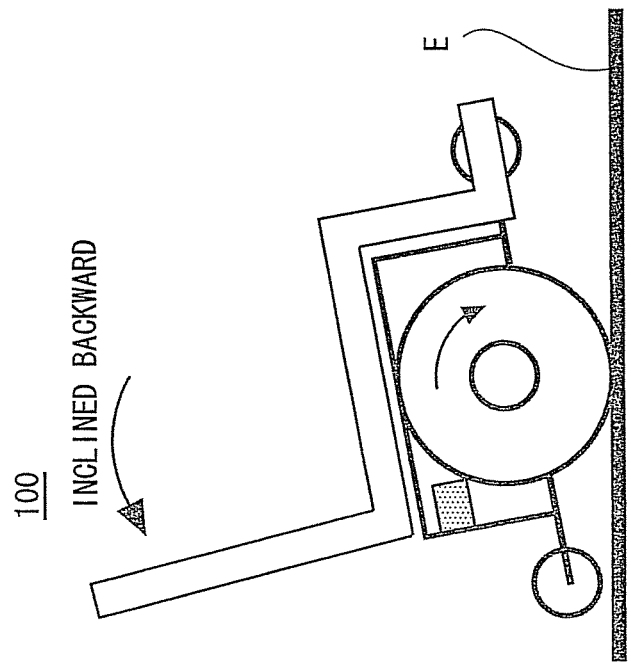
FIG. 6A is a diagram showing a state of auxiliary wheels when a traveling apparatus of the related art is inclined backward.

It is assumed herein that, for example, the traveling apparatus 10 is inclined backward due to any disturbance occurring when the traveling apparatus 10 performs desired traveling under the inverted pendulum control. In this case, in the traveling apparatus 100 of the related art, the abnormality degree R of the posture deviation Δη may increase and the traveling apparatus 100 may transition from a backward-inclined state (FIG. 6A) to a forward-inclined state, so that front auxiliary wheels may contact the ground (FIG. 6B). At this time, the front auxiliary wheels are brought into the forward-inclined state at once from the backward-inclined state (FIG. 6A) in which the auxiliary wheel height "h" is large, and are brought into contact with the road surface E strongly (FIG. 6B). This results in a large impact on the auxiliary wheels.

Figure 7A:
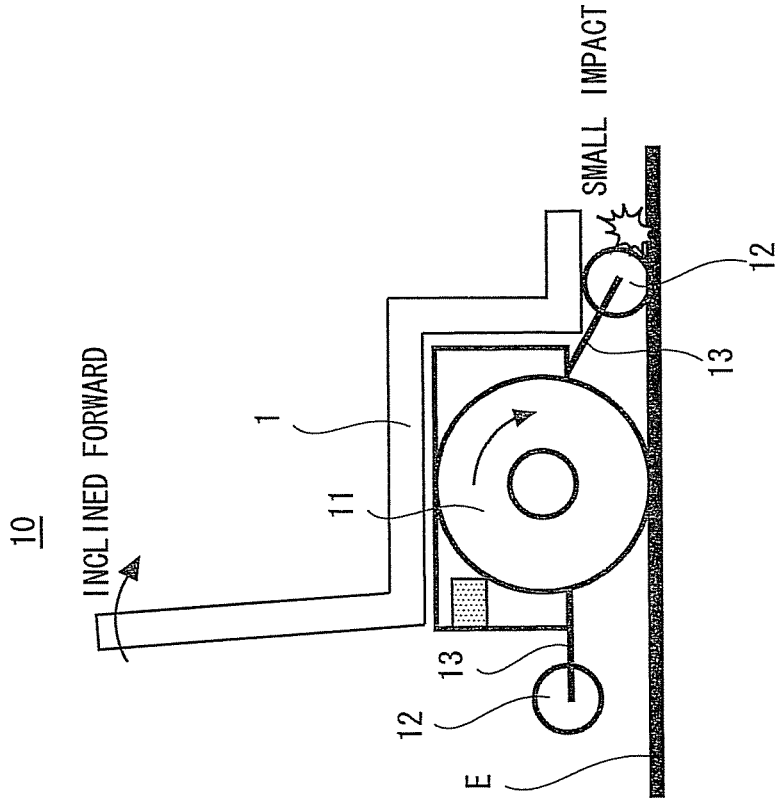
FIG. 7A is a diagram showing a state of the auxiliary wheels when the traveling apparatus according to an exemplary embodiment of the present invention is inclined backward.
Figure 7B:
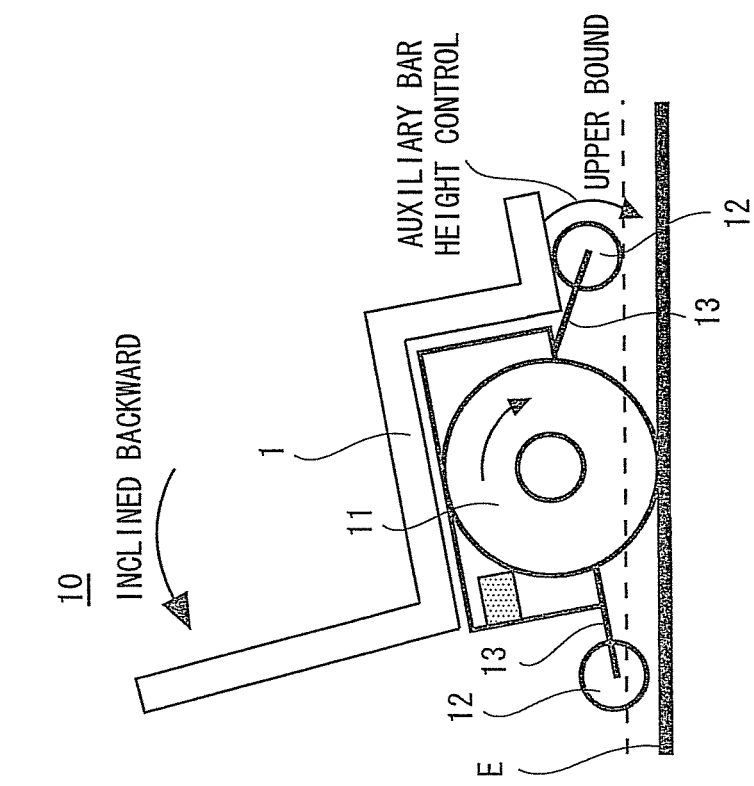
FIG. 7B is a diagram showing an exemplary state in which the traveling apparatus according to an exemplary embodiment of the present invention is inclined forward and the auxiliary wheels contact the ground.

Meanwhile, in the traveling apparatus 10 according to this exemplary embodiment, when the abnormality degree R of the posture deviation Δη increases in the backward-inclined state, the upper bound calculation portion 36 decreases the upper bound H of the auxiliary wheel height "h". Thus, the auxiliary bar control portion 37 controls in advance the swing of each of the auxiliary bars 13 so that the auxiliary wheel height "h" is smaller than or equal to the decreased upper bound H and that the auxiliary wheels 12 come closer to the road surface E. Accordingly, the auxiliary wheels 12 are brought into the ground-contact state (FIG. 7B), in which the auxiliary wheel height "h" is 0, from the state (FIG. 7A), in which the auxiliary wheel height "h" is set small in advance, without a large motion. This makes it possible to suppress the impact on the auxiliary wheels 12.

Figure 8B:
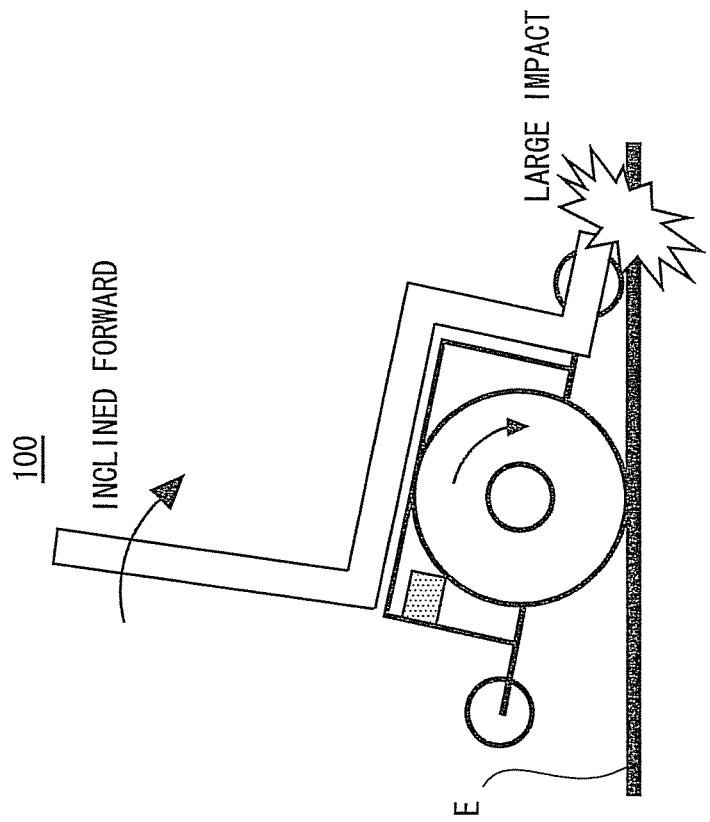
FIG. 8B is a diagram showing an exemplary state in which the auxiliary wheels of the traveling apparatus of the related art contact the ground.
Figure 8A:
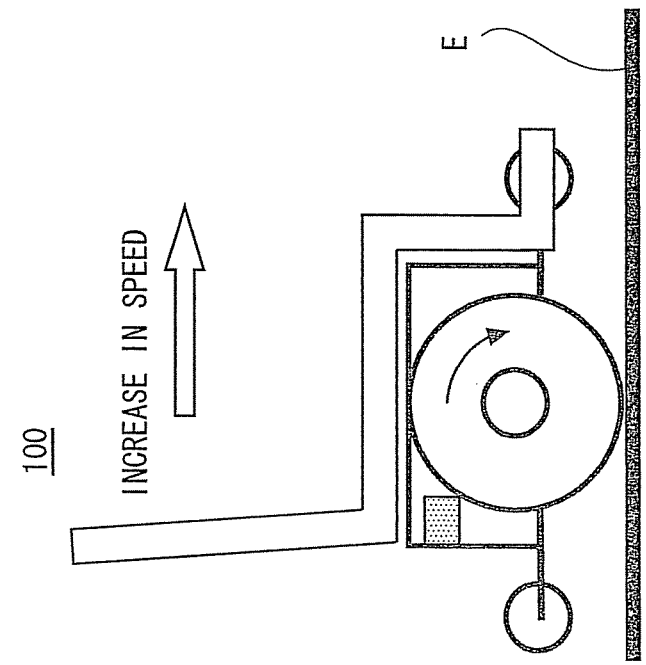
FIG. 8A is a diagram showing a state of the auxiliary wheels when the traveling apparatus of the related art are brought into a high-speed state.

Similarly, in the traveling apparatus 10, the abnormality degree R of the drive wheel deviation ΔW or the traveling speed V may increase in a high-speed state after acceleration. At this time, in the traveling apparatus 100 of the related art, the auxiliary wheels in the high-speed state are inclined forward from the state of the auxiliary wheel height "h" (FIG. 8A) and are brought into contact with the ground strongly (FIG. 8B). This results in a large impact on the auxiliary wheels.

Figure 9A:
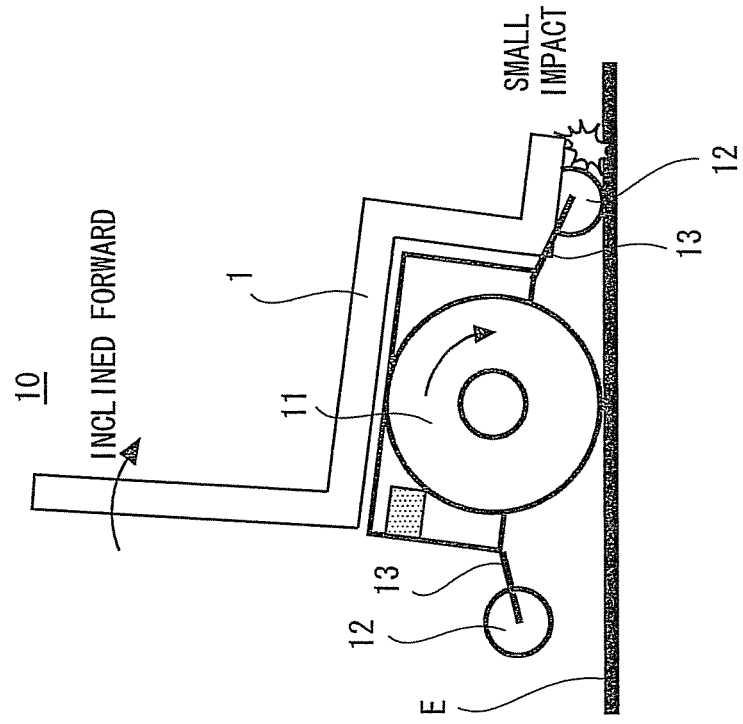
FIG. 9A is a diagram showing a state of the auxiliary wheels when the traveling apparatus according to an exemplary embodiment of the present invention are brought into the high-speed state.
Figure 9B:
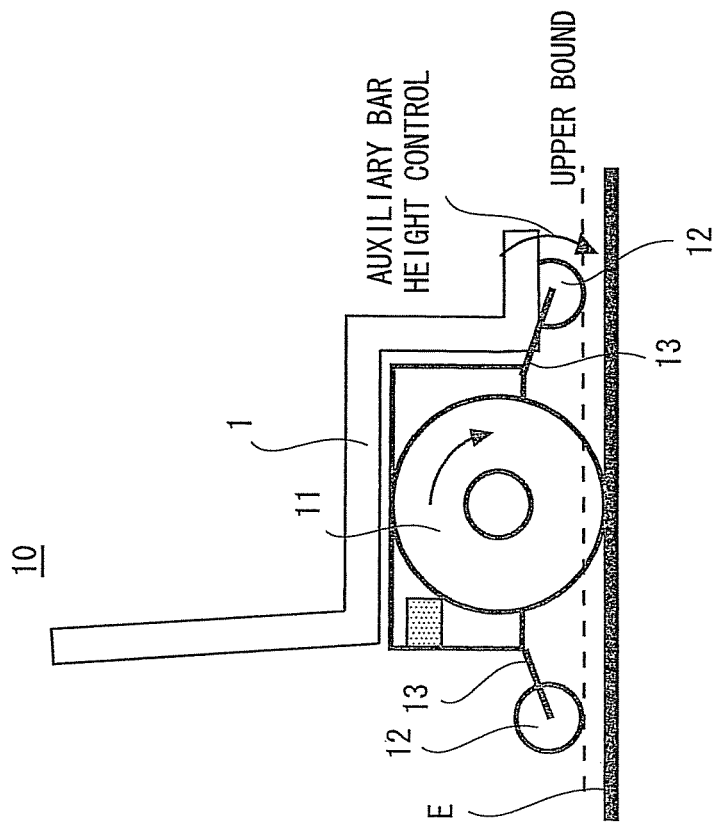
FIG. 9B is a diagram showing an exemplary state in which the auxiliary wheels of the traveling apparatus according to an exemplary embodiment of the present invention contact the ground.

Meanwhile, in the traveling apparatus 10 according to this exemplary embodiment, when the abnormality degree R of the drive wheel deviation ΔW or the traveling speed V increases in the high-speed state after acceleration, the upper bound calculation portion 36 decreases the upper bound H of the auxiliary wheel height "h". Thus, the auxiliary bar control portion 37 controls in advance the swing of each of the auxiliary bars 13 so that the auxiliary wheel height "h" is smaller than or equal to the decreased upper bound H and that the auxiliary wheels 12 come closer to the road surface E. Accordingly, the auxiliary wheels 12 are brought into the ground-contact state (FIG. 9B), in which the auxiliary wheel height "h" is 0, from the state (FIG. 9A), in which the auxiliary wheel height "h" is set small in advance, without a large motion. This makes it possible to suppress the impact on the auxiliary wheels 12.

Figure 10:
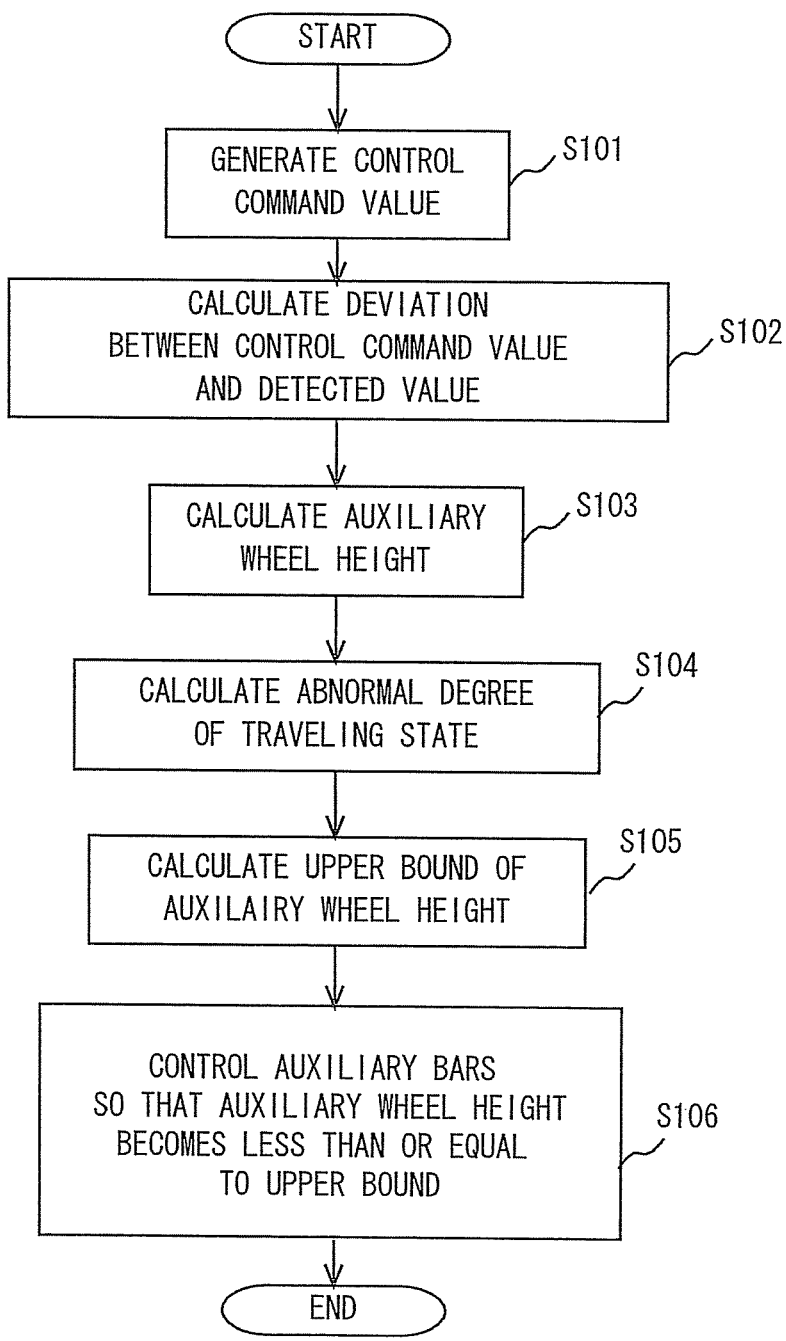
FIG. 10 is a flowchart showing an exemplary control processing flow of the traveling apparatus according to an exemplary embodiment of the present invention.

FIG. 10 is a flowchart showing an exemplary control processing flow of the traveling apparatus according to this exemplary embodiment.

The control command value generation portion 31 generates multiple control command values for controlling the auxiliary bar drive portion 14 and the wheel drive portion 15, based on the operation information input to the HMI device 4 (step S101), and outputs the generated control command values to the deviation calculation portion 32.

The deviation calculation portion 32 calculates deviations between the control command values generated by the control command value generation portion 31 and the detected values detected by the sensor portion 2 (step S102), and outputs the calculated deviations to each of the inverted pendulum control portion 33 and the abnormality degree calculation portion 35.

The actual height calculation portion 34 calculates the auxiliary wheel height "h" based on the posture angle of the vehicle body 1, which is detected by the posture sensor 21 of the sensor portion 2, the swing angle of each of the auxiliary bars 13, which is detected by the angle sensor 23, and the road information detected by the road surface sensor 24 (step S103). Then, the actual height calculation portion 34 outputs the calculated auxiliary wheel height "h" to the auxiliary bar control portion 37.

The abnormality degree calculation portion 35 calculates the ratios between each deviation calculated by the deviation calculation portion 32 and the maximum deviation, i.e., the abnormality degrees R of the traveling state (step S104). Then, the abnormality degree calculation portion 35 outputs the abnormality degree R having a maximum value among the multiple abnormality degrees R thus calculated, to the upper bound calculation portion 36.

The upper bound calculation portion 36 calculates the upper bound H of the auxiliary wheel height "h" based on the abnormality degree R calculated by the abnormality degree calculation portion 35 and the preset map information set (step S105), and outputs the calculated upper bound H to the auxiliary bar control portion 37.

The auxiliary bar control portion 37 controls the auxiliary bar drive portion 14 so that the auxiliary wheel height "h" calculated by the actual height calculation portion 34 is smaller than or equal to the auxiliary wheel height "h" calculated by the upper bound calculation portion 36, thereby controlling the swing of each of the auxiliary bars 13 (step S106).

As described above, in the traveling apparatus 10 according to this exemplary embodiment, the upper bound calculation portion 36 sets the upper bound H of the auxiliary wheel height "h" so as to decrease as the abnormality degree R of the traveling state, which is calculated by the abnormality degree calculation portion 35, increases. As a result, when the abnormality degree R of the traveling state increases and instability increases, the auxiliary wheels 12 are moved closer to the road surface E in advance, thereby making it possible to fully prepare for allowing the auxiliary wheels 12 to contact the ground. Therefore, for example, when the auxiliary wheels 12 contact the ground, the impact on the auxiliary wheels 12 can be suppressed, thereby improving the safety of the traveling apparatus 10.

Note that the present invention is not limited to the above exemplary embodiments and can be modified in various manners without departing from the scope of the present invention.

Figure 11:
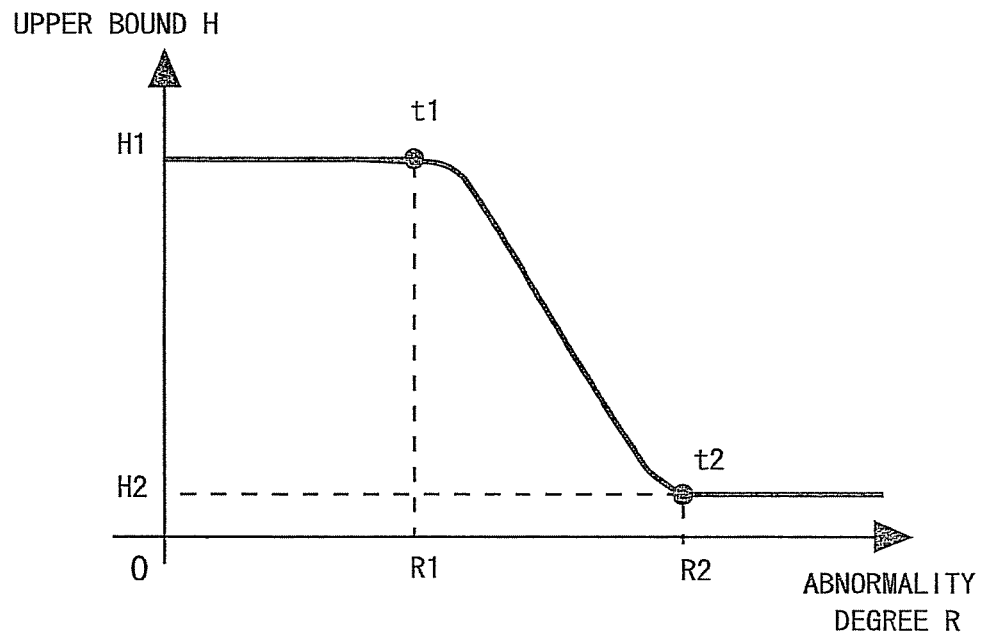
FIG. 11 is a graph showing map information indicating a relationship between an abnormality degree and an upper bound according a modified example of the present invention.

For example, in the map information indicating the relationship between the abnormality degree R and the upper bound H in the above exemplary embodiment, the upper bound H may be set so as to decrease more gradually in the vicinity of the abnormality degrees R1 and R2 (FIG. 11). This permits the auxiliary bars 13 to operate more smoothly. Alternatively, the upper bound H may be set so as to decrease as the abnormality degree R increases from R1 to R2, by using a polynomial of at least the second order.

Figure 12:
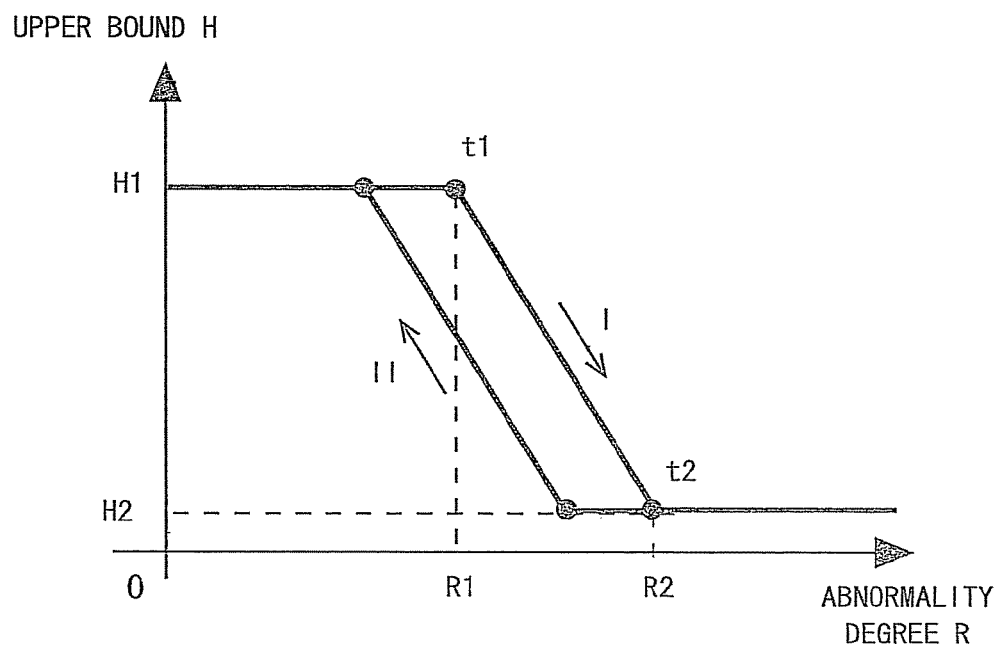
FIG. 12 is a graph showing map information indicating a relationship between the abnormality degree and the upper bound according to a modified example of the present invention.

Moreover, in the above exemplary embodiment, a hysteresis may be provided between the case where the abnormality degree R increases (I) and the case where the abnormality degree R decreases (II) (FIG. 12). As a result, a so-called hunting operation, which occurs when the swing of the auxiliary bars 13 is controlled, can be reduced, and the energy efficiency of the traveling apparatus 10 can be improved.

While in the above embodiment, the description has been made of an example where the present invention is implemented by hardware, the present invention is not limited thereto. The present invention can also be implemented by causing a CPU to execute the processing shown in FIG. 10 as a computer program. In this case, the computer program can be provided by recording the program in a recording medium. The computer program can be transmitted through the Internet and other communication media. Examples of the storage media include a flexible disk, a hard disk, a magnetic disk, a magneto-optical disk, a CD-ROM, a DVD, a ROM cartridge, a battery backup RAM memory cartridge, a flash memory cartridge, and a non-volatile RAM cartridge. Examples of the communication media include wired communication media such as a telephone line and wireless communication media such as a microwave line.

The present invention is applicable to, for example, a traveling apparatus which includes a ground contact member for stabilizing a vehicle and performs desired traveling under an inverted pendulum control.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A traveling apparatus which performs desired traveling under an inverted pendulum control, comprising:
    a ground contact stabilizer that operates to come into one of a ground contact state and a non-ground-contact state with respect to a road surface;
    drive means that drives the ground contact stabilizer;
    control means that controls the drive means;
    abnormality degree calculation means that calculates a degree of abnormality of a traveling state; and
    upper bound calculation means that changes an upper bound of a distance between the ground contact stabilizer and the road surface according to the degree of abnormality of the traveling state calculated by the abnormality degree calculation means,
    wherein the control means controls driving of the drive means so that the distance between the ground contact stabilizer and the road surface is smaller than or equal to the upper bound calculated by the upper bound calculation means, and prepares for allowing the ground contact stabilizer to contact the ground, and
    the upper bound calculation means decreases the upper bound to make the ground contact stabilizer closer to the road surface while maintaining the distance between the ground contact stabilizer and the road surface for the traveling apparatus to keep traveling as the degree of abnormality of the traveling state increases, the degree of abnormality being calculated by the abnormality degree calculation means.

2. The traveling apparatus according to claim 1, further comprising sensor means that detects a state quantity of the traveling apparatus,
    wherein the degree of abnormality of the traveling state is a ratio between a deviation between the state quantity of the traveling apparatus and a target value of the state quantity, and a maximum value of the deviation, the state quantity being detected by the sensor means.

3. The traveling apparatus according to claim 1, wherein the degree of abnormality of the traveling state includes a degree of abnormality of each of a posture state of the traveling apparatus, a rotation state of a drive wheel, and a traveling speed of the traveling apparatus.

4. The traveling apparatus according to claim 3, wherein the degree of abnormality of the traveling state is a ratio between a posture angle deviation between an actual posture angle and a target posture angle, and a maximum value of the posture angle deviation.

5. The traveling apparatus according to claim 3, wherein the degree of abnormality of the traveling state is a ratio between (a drive wheel deviation between an actual rotation angle of the drive wheel and a target rotation angle of the drive wheel), and (a maximum value of the drive wheel deviation).

6. The traveling apparatus according to claim 3, wherein the degree of abnormality of the traveling state is a ratio between a traveling speed and a maximum value of the traveling speed.

7. The traveling apparatus according to claim 1, wherein the abnormality degree calculation means calculates a plurality of degrees of abnormality of the traveling state, wherein the plurality of degrees of abnormality includes a posture deviation ratio, a drive wheel deviation ratio and a traveling speed ratio, and
    wherein the abnormality degree calculation means is programmed to select the degree of abnormality having a maximum value from among the plurality of degrees of abnormality calculated, and
    the upper bound calculation means changes the upper bound based on the degree of abnormality selected by the abnormality degree calculation means and on map information indicating a relationship between the degree of abnormality and the upper bound.

8. A control method for a traveling apparatus which performs desired traveling under an inverted pendulum control, the method comprising:
    calculating, by a processor, a degree of abnormality of a traveling state;
    changing, by a processor, an upper bound of a distance between a ground contact stabilizer and a road surface according to the degree of abnormality of the traveling state calculated, wherein the ground contact stabilizer is driven by drive means, and the ground contact stabilizer operates to come into one of a ground-contact state and a non-ground-contact state with respect to the road surface; and controlling, by a processor, driving of the drive means so that the distance between the ground contact stabilizer and the road surface is smaller than or equal to the upper bound calculated, and preparing for allowing the ground contact stabilizer to contact the ground, and decreasing, by a processor, the upper bound to make the ground contact stabilizer closer to the road surface while maintaining the distance between the ground contact stabilizer and the road surface for the traveling apparatus to keep traveling as the calculated degree of abnormality of the traveling state increases.

9. A traveling apparatus which performs desired traveling under an inverted pendulum control, comprising:

a ground contact stabilizer that operates to come into one of a ground contact state and a non-ground-contact state with respect to a road surface;

a drive portion that drives the ground contact stabilizer;

a control portion that controls driving of the drive unit;

an abnormality degree calculation portion that calculates a degree of abnormality of a traveling state; and an upper bound calculation portion that changes an upper bound of a distance between the ground contact stabilizer and the road surface according to the degree of abnormality of the traveling state calculated by the abnormality degree calculation portion, wherein the control portion controls the driving of the drive portion so that the distance between the ground contact stabilizer and the road surface is smaller than or equal to the upper bound calculated, and prepares for allowing the ground contact stabilizer to contact the ground, and the upper bound calculation portion decreases the upper bound to make the ground contact stabilizer closer to the road surface while maintaining the distance between the ground contact stabilizer and the road surface for the traveling apparatus to keep traveling as the degree of abnormality of the traveling state increases, the degree of abnormality being calculated by the abnormality degree calculation portion.

\* \* \* \* \*